(12) United States Patent
Terry

(10) Patent No.: US 12,199,811 B2
(45) Date of Patent: Jan. 14, 2025

(54) MISCONFIGURED MIRROR PORT DETECTION

(71) Applicant: Sophos Limited, Abingdon (GB)

(72) Inventor: Neil Richard Terry, Cedar Hills, UT (US)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 18/071,132

(22) Filed: Nov. 29, 2022

(65) Prior Publication Data
US 2024/0179043 A1    May 30, 2024

(51) Int. Cl.
*H04L 41/0604* (2022.01)
*H04L 41/0659* (2022.01)
*H04L 43/16* (2022.01)

(52) U.S. Cl.
CPC ...... *H04L 41/0627* (2013.01); *H04L 41/0661* (2023.05); *H04L 43/16* (2013.01)

(58) Field of Classification Search
CPC .. H04L 41/0627; H04L 41/0672; H04L 43/16
See application file for complete search history.

(56) References Cited

U.S. PATENT DOCUMENTS

| | | | | |
|---|---|---|---|---|
| 6,735,679 B1* | 5/2004 | Herbst | ............... | H04L 47/10 |
| | | | | 711/167 |
| 8,867,915 B1* | 10/2014 | Vahdat | ............... | H04B 10/27 |
| | | | | 398/55 |
| 2006/0251071 A1* | 11/2006 | Oh | ............... | H04L 47/29 |
| | | | | 370/390 |
| 2013/0124607 A1* | 5/2013 | Griffith | ............... | H04L 43/50 |
| | | | | 709/203 |
| 2014/0269252 A1 | 9/2014 | Anumala | | |
| 2018/0337945 A1* | 11/2018 | Takabe | ............... | H04L 63/1425 |
| 2019/0140893 A1 | 5/2019 | Artzi et al. | | |
| 2019/0372861 A1* | 12/2019 | Roy | ............... | H04L 41/5074 |
| 2021/0409271 A1* | 12/2021 | Jacob Da Silva | .. | H04L 41/0866 |

OTHER PUBLICATIONS

Combined Search and Examination Report in GB2318260.3 mailed on May 22, 2024.
"Unable to receive the unicast traffic from others" 2019, Wireshark, https://ask.wireshark.org/question/10073/unable-to-receive-the-unicast-traffic-from-others/.

(Continued)

*Primary Examiner* — Joseph L Greene
(74) *Attorney, Agent, or Firm* — Schmeiser, Olsen & Watts LLP; Victor J. Baranowski

(57) ABSTRACT

A method includes monitoring a plurality of packets received by a network sensor associated with a port of a network, determining a ratio of unicast, multicast or broadcast packets to a total number of packets for the plurality of packets, determining that the ratio is outside the bounds of a threshold range, detecting that a port is misconfigured based on the determination that the ratio is outside the bounds of a threshold range, and automatically notifying a network administrator that the port is misconfigured based on the determination that the ratio is outside the bounds of a threshold range. Further disclosed is a computer system and computer program product configured to perform the method.

20 Claims, 10 Drawing Sheets

(56) References Cited

OTHER PUBLICATIONS

Chappel "Wireshark Network Analysis: the official Wireshart certified network analyst study guide, chapter 1" 2010, http://cdn.ttgtmedia.com/searchNetworking/downloads/chapter1_wiresharkbook.pdf.

"Wireshark" Wikipedia, 2010, https://en/wikipedia.org/w/index.php?title=Wireshark&oldid=353286238.

"How to configure port monitoring (SPAN) on a Catalyst 2940, 2950, 2955, 2970, 3550 or 3750 series switch" Cisco, 2019, https://community.cisco.com/t5/networking-knowledge-base/how-to-configure-port-monitoring-span-on-a-catalyst-2940-2950/ta-p/3132032.

* cited by examiner

MISCONFIGURED MIRROR PORT DETECTION

FIELD

The present disclosure relates generally to packet mirroring for threat detection. More specifically, this application relates to detecting a misconfigured port in a packet forwarding configuration.

BACKGROUND

Network sensors in threat management computer systems capture network packets and examine such packets in order to detect threats. To accomplish this, network sensors often rely on network infrastructure to forward all packets received to a network sensor (i.e. a network detection device, a intrusion detection system, an application performance management system, or the like) for examination.

Network infrastructure for accomplishing this might be a physical switch where packet forwarding is done via a switch configuration called packet mirroring. The network infrastructure could also be a virtual switch. For example, in the case of a "VSwitch" used by VMWare's ESX virtual machine platform, packet forwarding is done by allowing a virtual machine's virtual NIC to enable a promiscuous mode. In another virtual switch example, a "virtual switch" in Microsoft's HyperV virtual machine platform forwards packets via a mode called "port mirroring." The device could also be a Software Defined Networking (SDN) technology used on platforms like the virtual private cloud (VPC) platform for Amazon Web Service (AWS). In this case, packet forwarding is done using a VPC feature called "traffic mirroring."

Whatever the network infrastructure, when configured correctly a packet forwarding technology will send packets to the network sensor which would not otherwise (if not for the mirroring or forwarding) be destined for the network sensor. A network packet includes in its data a destination MAC address. This destination MAC address uniquely identifies with a network node that the packet is destined for. Enabling the various mirroring and packet forwarding modes described above allows for the network sensor to receive network packets that do not match the destination MAC address of the packet. A network also broadcasts packets intended for all nodes of a network. These packets include especially formatted destination MAC addresses.

Configuring a network for packet forwarding for examination by a network sensor is not simple and is typically performed by experienced network infrastructure personnel. Even then, mistakes can occur, and packet forwarding does not occur as intended. Detection of a misconfigured packet forwarding configuration is necessary prior to resolution of the misconfiguration and maintaining protection of a network.

SUMMARY

According to embodiments disclosed herein, a method, and associated computer system and computer program product for detecting a misconfigured port. According to the method, one or more processors of a computer system monitor a plurality of packets received by a network sensor associated with a port of a network. The one or more processors of the computer system determine a ratio of unicast, multicast or broadcast packets to a total number of packets for the plurality of packets, determine that the ratio is outside the bounds of a threshold range, and detect that a port is misconfigured based on the determination that the ratio is outside the bounds of a threshold range. The one or more processors of the computer system then automatically notify a network administrator that the port is misconfigured based on the determination that the ratio is outside the bounds of a threshold range.

DETAILED DESCRIPTION

Figure 1:
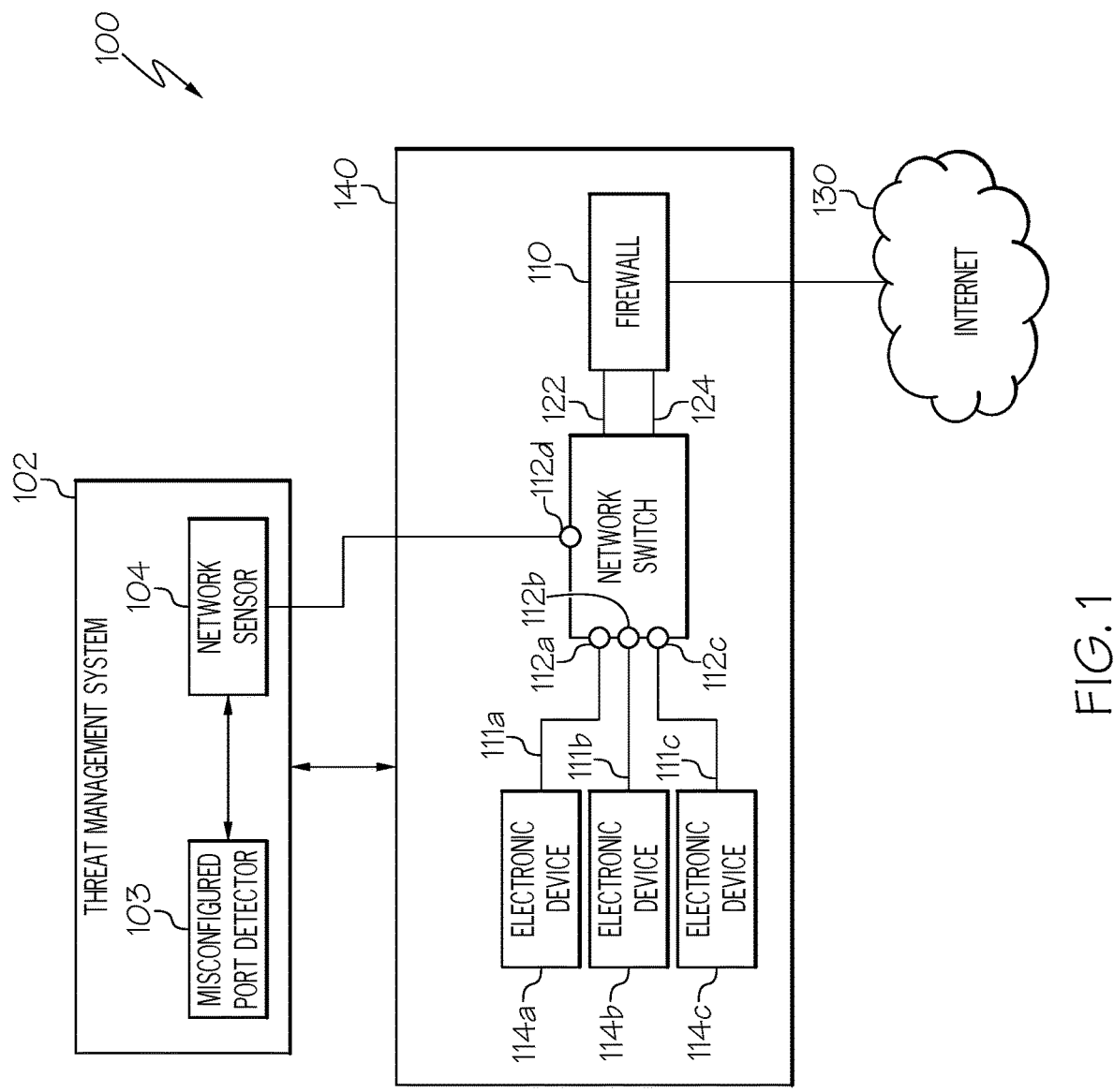
FIG. 1 depicts a network sensor and port mirroring architecture according to an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Embodiments herein describe how systems and methods for monitoring packets received by a network sensor, network detection device, intrusion detection system, network packet examination system or sensor, application performance management system, or the like, in order to determine and detect when a port is misconfigured. In particular, embodiments include monitoring packets received in order to compare how many packets being received by the network sensor include a special broadcast MAC address versus how many packets are unicast packets (i.e. packets sent with a single intended destination device). If it is determined that too many packets being received by the network sensor are broadcast packets (or alternatively that not enough packets are unicast packets), then systems and methods described herein are configured to warn a user or network administrator that a port may be misconfigured and that the network sensor is not currently connected for port mirroring and that the packet forwarding configuration on the network is not working as intended.

Hereinafter, a network sensor means any application performance management system, threat detection system, network sensor, intrusion detection system, or other monitoring device. A network sensor may be embodied by hardware, software, and/or a combination thereof. As described herein, a network sensor may be configured to receive packets not specifically intended for the network sensor (but instead intended for one or more various other devices on the network) via port mirroring, traffic mirroring, and/or packet forwarding. This allows the network sensor to receive packets that do not match the destination MAC address of the packet, which, but for the mirroring, would not be otherwise destined for the network sensor.

Hereinafter, a "unicast packet" means any type of packet configured for one-to-one transmission between a single sender and a single recipient, i.e. packets configured for one-to-one transmission. For example, unicast packets may flow from a single point (such as a web server) to a single point such as a client device.

A "broadcast packet" means a packet which is sent from one source to all possible destinations on a network, i.e. packets configured for one-to-all transmission. For example, an address resolution protocol (ARP) request broadcast may be sent, using broadcast packets, to all devices on a network (whereas an ARP response is typically unicast back from any given device).

A "multicast packet" means a packet which is sent from one source to multiple destinations, i.e. packets configured for one-to-many transmission. For example, a multicast may be utilized by a server to direct single copies of a data stream that are then simulated and routed to hosts that request it using multicast packets.

Referring now to the Figures, FIG. 1 depicts a network sensor 104 and port mirroring architecture 100 is shown according to an example embodiment. The port mirroring architecture 100 includes a threat management system 102 connected to a network 140. The network 140 may be an enterprise system, client system or any other type of network which might be monitored by the threat management system 102.

The threat management system 102 includes the network sensor 104 that is connected to a misconfigured port detector system 103. The threat management computer system 102 may be a threat management facility, such as the threat management facility 900 shown in FIG. 9 and described below. The threat management system 102 may be a computer system and/or cloud service system which is connectable to the network 140. The network 140 may be an enterprise facility having a network of endpoints, such as the network 902 shown in FIG. 9 and described below. The network 140 may be considered a customer, client, subscriber, or the like, of the services provided by the threat management system 102.

The network 140 is shown including a firewall 140 which is connected to external networks, such as the internet 130. Connected to the firewall 140 is a network switch 108. The network switch 108 may represent any type of network switch system 108, both physical and/or virtual, or a combination thereof. The network switch 108 includes a plurality of ports 112a, 112b, 112c, 112d. Various ports 112a, 112b, 112c are connected to respective electronic devices 114a, 114b, 114c via information channel 111a, 111b, 111c. The network switch 108 is further connected to the network sensor 104 via the port 112d and information channel 126. The network switch 108 provides access to one or more local area networks, or virtual local area networks 122, 124 which then connect through the firewall 110 to an outside network, such as the internet 130.

The network sensor 104 of the threat management system 102 may be a hardware system, software system or a combination thereof. For example, the network sensor 104 may be a software environment that includes a combination of software and/or hardware configured to analyze events and/or information or data received by the network sensor 104 and perform threat and/or device health analysis on the information to determine a device health status associated with particular devices, and/or user accounts associated with those particular devices. The network sensor 104 may include systems configured to receive information about devices, such as via the information channel 126 from the network 140.

The network sensor 104 may be a service configured to receive and/or process incoming information (e.g. information which may impact or relate to device health or the like) from devices or endpoints associated with the enterprise computer system 140. The network sensor 104 may be configured to provide received information to various other aspects of the threat management system 102 such as the facilities shown in FIG. 9 and described herein below. Alternatively, the network sensor 104 may be configured to process received information and characterize the received information in accordance with the principles shown in FIGS. 9 and 10 and described below. For example, the device sensor 104 may be configured to characterize device health using a coloring system, such as the coloring system 1010 (shown in FIG. 10). Thus, the device sensor 104 may include software and/or hardware that is capable of receiving, analyzing and processing information related to device health, and make determinations according to that information as to the health of a device. In this manner, device sensor 104 may be configured to determine a health status of an electronic device in, or otherwise associated with, the network 140, such as the electronic devices 114a, 114b, 114c.

The electronic devices 114a, 114b, 114c connecting to the network switch 108 may be any type of electronic device known in the art, such as a personal computer, a laptop computer, a desktop computer, a surface computer, a mobile device, an internet of things (IOT) device, or the like. Any type of device or endpoint connectable to a network switch is contemplated. The electronic devices 114a, 114b, 114c may also be virtual machines or virtual devices or any other type of endpoint system monitored by the threat management system 102.

As described, the network switch 108 may represent any type of network switch system 108, both physical and/or virtual, or a combination thereof. For example, the network switch 108 may be a physical switch having any number of ports, such as an 8-port switch, a 24-port switch or a 48-port switch. The network switch 108 may include Power over Ethernet (POE) technology, allowing both connection to and powering of devices using PoE technology. The network switch 108 may be configured to segment internal traffic through the network switch 108 into one or more secure VLANs, such as the VLANs 122, 124, which may be protected by the firewall 110 and ACLs applied by the switch. The network switch 108 may be deployable in a software defined wide area network (SD-WAN) of the network 140 in some embodiments. The network switch 108 may be configurable remotely by the connection 126 to the device sensor 104 and/or other systems of the threat management computer system 102.

The device sensor 104 may be configured to receiving mirrored or forwarded packets containing information associated with the electronic devices 114a, 114b, 114c, in order to process, analyze, and make determinations as to device health statuses. The device sensor 104 may process this information, or may provide this information to other systems of the threat management system 102 for processing.

Network switch 108 may be physical switch where packet forwarding is done via a switch configuration called packet mirroring. The network switch 108 could also be a virtual switch. For example, in the case of a "VSwitch" used by VMWare's® ESX virtual machine platform, packet forwarding is done by allowing a virtual machine's virtual NIC to enable a promiscuous mode. In another virtual switch example, a "virtual switch" in Microsoft's® HyperV virtual machine platform forwards packets via a mode called "port mirroring." The network switch 108 could also represent a Software Defined Networking (SDN) technology, and may perform, for example, "traffic mirroring." In the event of a virtual switch, it should be understood that the ports 112a, 112b, 112c may be virtual ports, rather than physical ports.

Whatever the embodiment, the network switch 108 may be configured to mirror or forward packets sent from devices inside or outside the network 140 that are intended for one or any of the electronic devices 114a, 114b, 114c of the network 140 to the network sensor 104. For example, the network switch 108 may be configured to mirror unicast packets intended for one of the electronic devices 114a, 114b, 114c so that a replicated or mirrored packet is also provided to the network sensor 104.

While the network sensor 104 is shown as an element of the threat management system 102, in other embodiments, the network sensor 104 may be an element of the network 140. For example, the network sensor 104 may be an instance or application deployed within the network 140. In such an embodiment, the network sensor 104 may be deployed by, for example, the threat management system 102. Alternatively, the threat management system 102 may be an internally deployed threat management system that is actually a feature within the network 140. In the embodiment where the network sensor 104 is deployed as an element of the network 140, the network sensor 104 may be connected to the threat management system 102 in order to provide mirrored packets and/or insights based on the received mirrored packets, to the threat management system 102 for analysis.

However the network sensor 104 is deployed, the network sensor 104 may be monitored by the misconfigured port detector 103 in accordance with embodiments herein. The misconfigured port detector 103 may be a system that is embodied by a software application, a hardware system, or a combination of software and hardware. As shown, the misconfigured port detector 103 may be a component of the threat management system 102. In other embodiments, the misconfigured port detector 103 may be a component or element of the network sensor 104. Alternatively or additionally, the misconfigured port detector 103 may be either a component within the network 140, or the like. Whatever the embodiment, the misconfigured port detector 103 may be configured to perform the steps, process or operations described herein. In various embodiments, the misconfigured port detector 103 may include or utilize a computer system having one or more processors, a memory system and a storage system, like the computing device 1100 shown in FIG. 11 and described hereinbelow.

The misconfigured port detector 103 may be configured to monitor a plurality of packets received by the network sensor 104 associated with a port 112d of the network 140 via the information channel 126. After receiving predetermined amount of packets, for example, the misconfigured port detector 103 may be next configured to determine a ratio of unicast, multicast or broadcast packets to a total number of packets for the plurality of packets.

For example, in one embodiment, the misconfigured port detector 103 may be configured to determine the ratio of unicast packets to a total number of packets. In this embodiment, determining that the ratio is beyond the bounds or outside the bounds of the threshold range includes determining that the ratio is less than a threshold. For example, the threshold may be less than one percent. Thus, if less than one percent of the packets received by the network sensor 104 are unicast packets, this may be considered outside or beyond the bounds of the set threshold. Other thresholds are contemplated. In this example, much higher thresholds such as 90%, 50%, 10% or 5% are also contemplated. In some embodiments, the threshold sensitivity may be a configurable setting for the misconfigured port detector 103. For example, the misconfigured port detector 103 may be configured to provide a user, such as a network administrator or a threat manager or IT professional, a sensitivity option for the threshold range. The misconfigured port detector 103 may be configured to receive a selection or input of a sensitivity option from the user in order to configure the threshold sensitivity of the system.

In a typical network system, the ratio of unicast packets received by the network sensor 104 to the total packets received may be close to 99.9% when a port is properly configured, because the port mirroring forwards or mirrors the many unicast packets sent to one or more of the electronic devices 111a, 111b, 111c. In such a typical properly configured situation, the amount of broadcast packets or multicast packets received by the network sensor 104 may be extremely low and outweighed by the many unicast packets sent to the network sensor 104 as a result of the proper mirroring configuration. However, in the event that the port is improperly configured, or that there is a problem and the mirroring is not working, the number of unicast packets received by the network sensor 104 may be close to zero or zero. In such an embodiment with a misconfigured port with no mirroring occurring, the only packets received from the port 112d by the network sensor 104 may be globally broadcast packets sent to every single port. Thus, the ratio of unicast packets to total packets will be close to zero, while the ratio of global packets to total packets will be close to or at 100%.

In other embodiments, the misconfigured port detector 103 may utilize the number of broadcast packets received relative the total number of packets received (rather than unicast packets). In such an embodiment, the determining that the ratio is outside or beyond the bounds of the threshold range may be determining that the ratio is greater than a threshold value. For example, the threshold range may be when global packets are greater than 10%, 50%, 75%, 90% or 99%.

Whatever the embodiment, the misconfigured port detector 103 may be configured to receive, inspect and or review packets received by the port 112d of the network switch 108. If the misconfigured port detector 103 determines that the ratio is outside or beyond the bounds of the threshold range, the misconfigured port detector 103 may thereby detect that the port is misconfigured. This may trigger the misconfigured port detector 103 to automatically notify a network administrator that the port is misconfigured. For example, the misconfigured port detector 103 may be an application, threat management system, and/or network management system, which includes a user interface which provides information to a network administrator or other user via a device display or the like. This automatic notification may take the form of a message to the user. In other embodiments, the misconfigured port detector 103 may integrate with a communication system, such as an email system or direct messaging or chat system. The misconfigured port detector 103 may be configured to send a warning message, to one or more users and/or network administrators or threat management personnel via the communication system. In other embodiments, the message may also include a recommended remedial action. This recommended remedial action may be determined by the misconfigured port detector 103 based on the facts and circumstances and information received by the misconfigured port detector 103. For example, it may be possible to determine, from the facts, that the network sensor 104 is connected to the wrong port and needs to be physically switched or plugged into another port. The misconfigured port detector 103 may be configured to provide instructions to the user or network administrator for how to make a configuration change. Whatever the embodiment, the misconfigured port detector 103 may be configured to notify, warn or alarm a user if a misconfigured port is detected.

Alternatively, the misconfigured port detector 103 may be configured to trigger an automated response after the detection that the port is misconfigured. For example, the automated response may include inspecting, by the misconfigured port detector 103, a unicast packet received by the port, determining a switch port number associated with the unicast packet and using one or more application programming interfaces to change a configuration associated with the port of the network. The misconfigured port detector 103 may be configured to change a switch configuration so that the network sensor 104 matches the switch port which was set up for mirroring in the event that the network sensor 104 was connected to the wrong port. In the case of a virtual port and virtual network switch, this change may occur automatically in response to the system detecting the misconfigured port. If such a change is automatically instituted by the misconfigured port detector 103, a notification or message may be provided to a user indicating that such a change was made.

Figure 2:
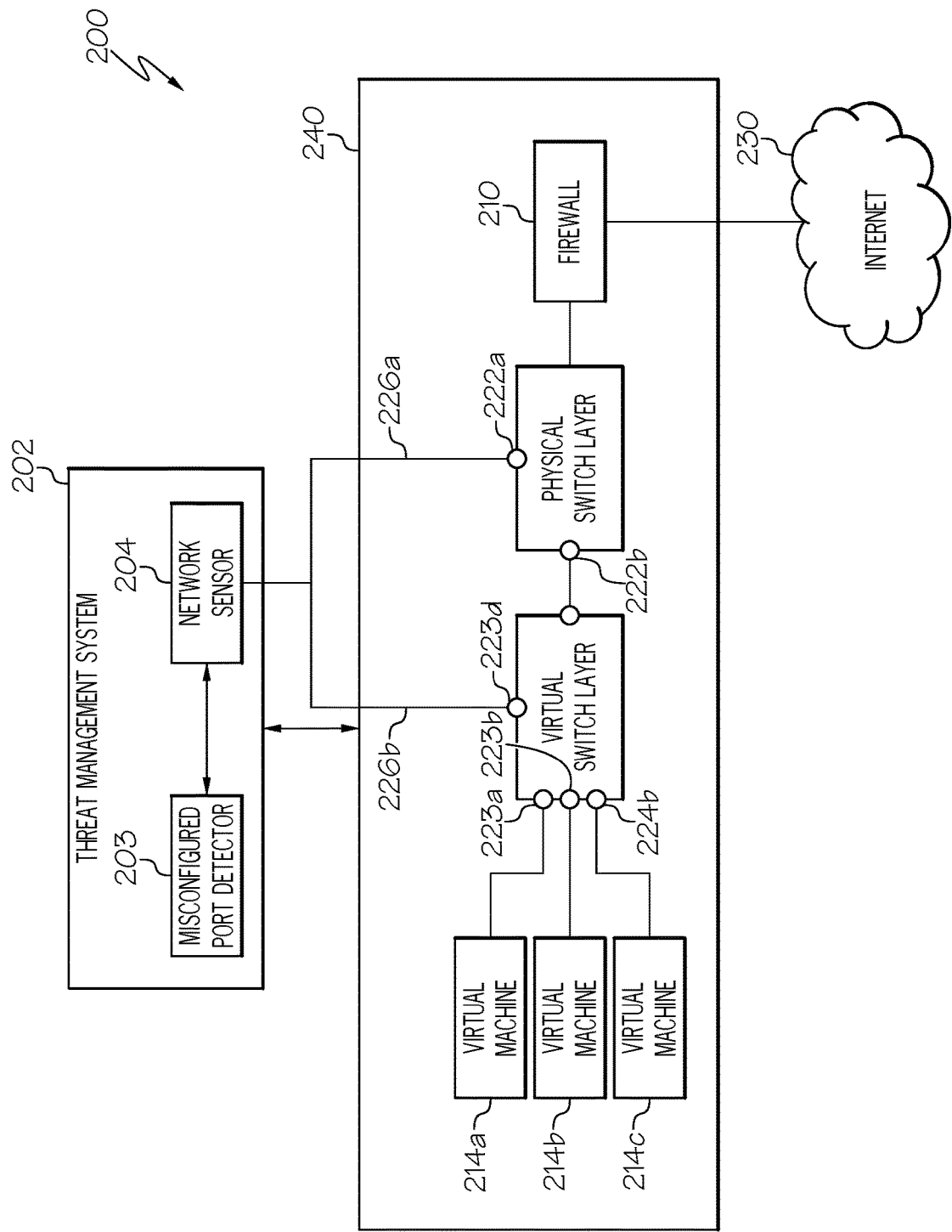
FIG. 2 depicts a network sensor and port mirroring architecture having a virtual switch according to an example embodiment.

FIG. 2 depicts a network sensor 204 and port mirroring architecture 200 having both a physical switch layer 208 and a virtual switch layer 209 according to an example embodiment. The port mirroring architecture may have the same or similar components to the port mirroring architecture 100 shown in FIG. 1. The port mirroring architecture 200 thereby includes a network 240 having a firewall 210 connected to an outside network such as the internet 230. Connected to the firewall 210 is the physical switch layer 208, followed by the virtual switch layer 209. The virtual switch layer 209 connects to a plurality of virtual machines 214a, 214b, 214c. In this embodiment, the network 240 may be or include one or more cloud instances or cloud environments, for example.

Connected to the network 240 is a threat management system 202 (such as the threat management system 102) having a network sensor 204 (such as the network sensor 104) connected to a misconfigured port detector 203 (such as the misconfigured port detector 103).

The physical switch layer 208 is shown having a plurality of ports including a first port 222a connected to the network sensor 204 of the threat management system 102 via an information channel 226a. A second port 222b of the physical switch layer 208 is shown connecting the physical switch layer 208 to the virtual switch layer 209. The virtual switch layer 209 includes a plurality of virtual ports 223a, 223b, 223d each connected to one of the virtual machines 214a, 214b, 214c, respectively. The virtual switch layer 209 further includes a port 223d connected to the network sensor 204.

In the embodiment shown, mirroring may be provided via one or both of the physical switch layer 208 and the virtual switch layer 209. While the physical switch layer 208 is shown only connected to the virtual switch layer 223d, it should be understood that any number of devices may connect directly to the physical switch layer 208, and the physical switch layer 208 may include other ports not shown. Any number of these ports may be set up to be mirrored, whereby the mirrored packets may be provided to the network sensor 204, as described above. Likewise, any or all of the ports 223*a*, 223*b*, 223*d* may be mirrored and/or packets may be forwarded through the port 223*d* to the network sensor 204 via an information channel 226*b*.

While the architecture is different, the principle operation of the misconfigured port detector 203 may be the same as the embodiments described above. While the architectures shown are exemplary, it should be understood that any type of port mirroring architecture is contemplated, both physical or virtual and/or cloud based.

Figure 3:
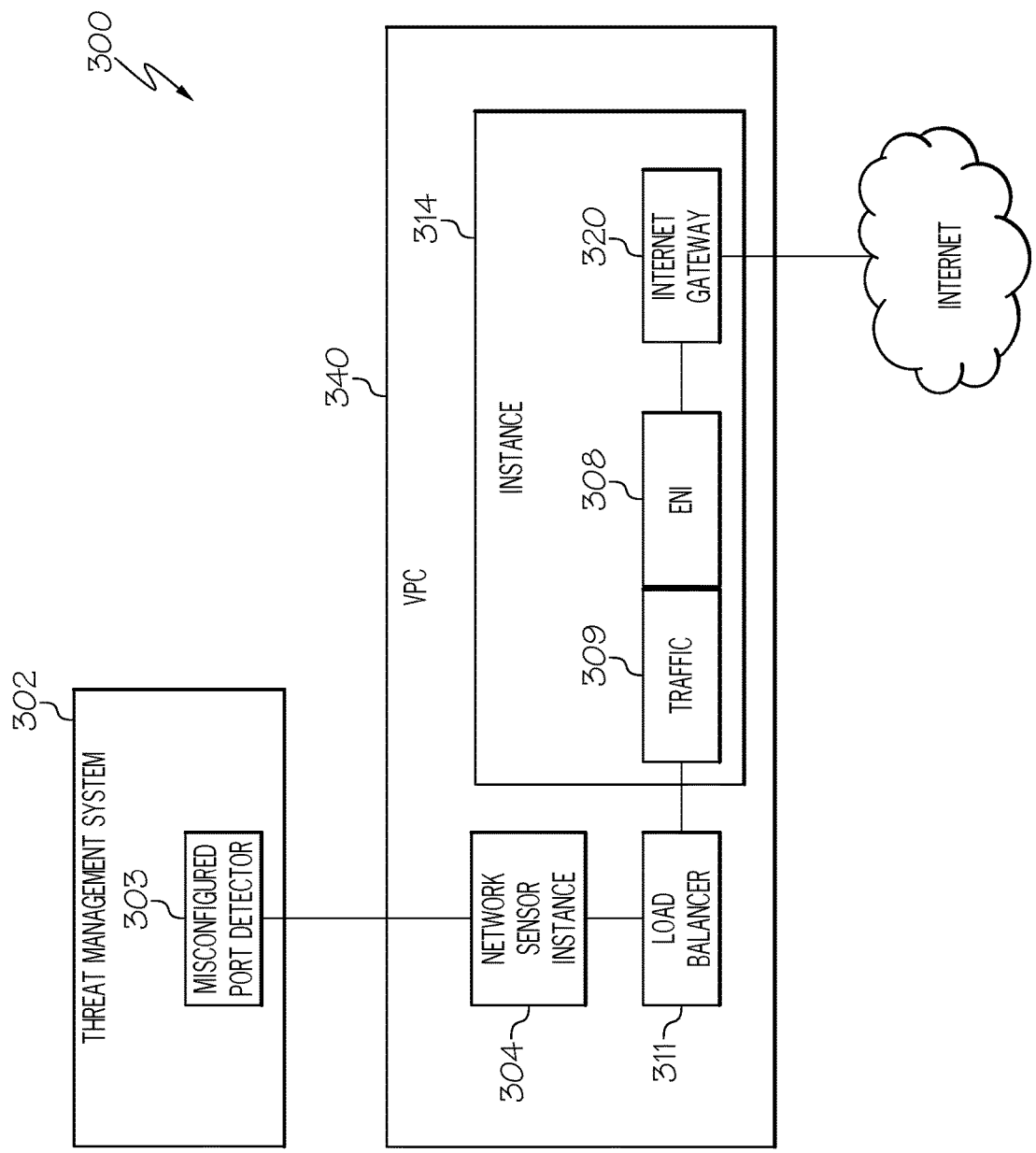
FIG. 3 depicts a virtual private cloud system with traffic mirroring according to an example embodiment.

FIG. 3 depicts a virtual private cloud system 300 with traffic mirroring according to an example embodiment. The virtual private cloud system 300 includes a virtual private cloud 340 having an instance 314 with an internet gateway 310 connected to an outside environment such as the internet 330. While only a single instance 314 is shown, the virtual private cloud 340 may include any number of instances.

The internet gateway 310 is connected to an electronic network interface (ENI) 308 which has been configured for traffic mirroring with a traffic mirror system 309. It should be understood that while only one ENI 308 is shown, any number of ENI's may be connected to the internet gateway 310, which may connect to any number of cloud deployments, virtual machines, or the like. The traffic mirror 309 is configured to forward packets sent through the ENI to other systems connected to the ENI (not shown). This packet mirroring sends packets first to a load balancer system 311 which then provides the packets to a network sensor application instance 304 which has been deployed in the virtual private cloud 340 by the threat management system 302. A misconfigured port detector 303 system is shown connected to the deployed application instance of the network sensor 304. Again, while the architecture is different, the principle operation of the misconfigured port detector 303 may be the same as the embodiments described above.

Figure 4:
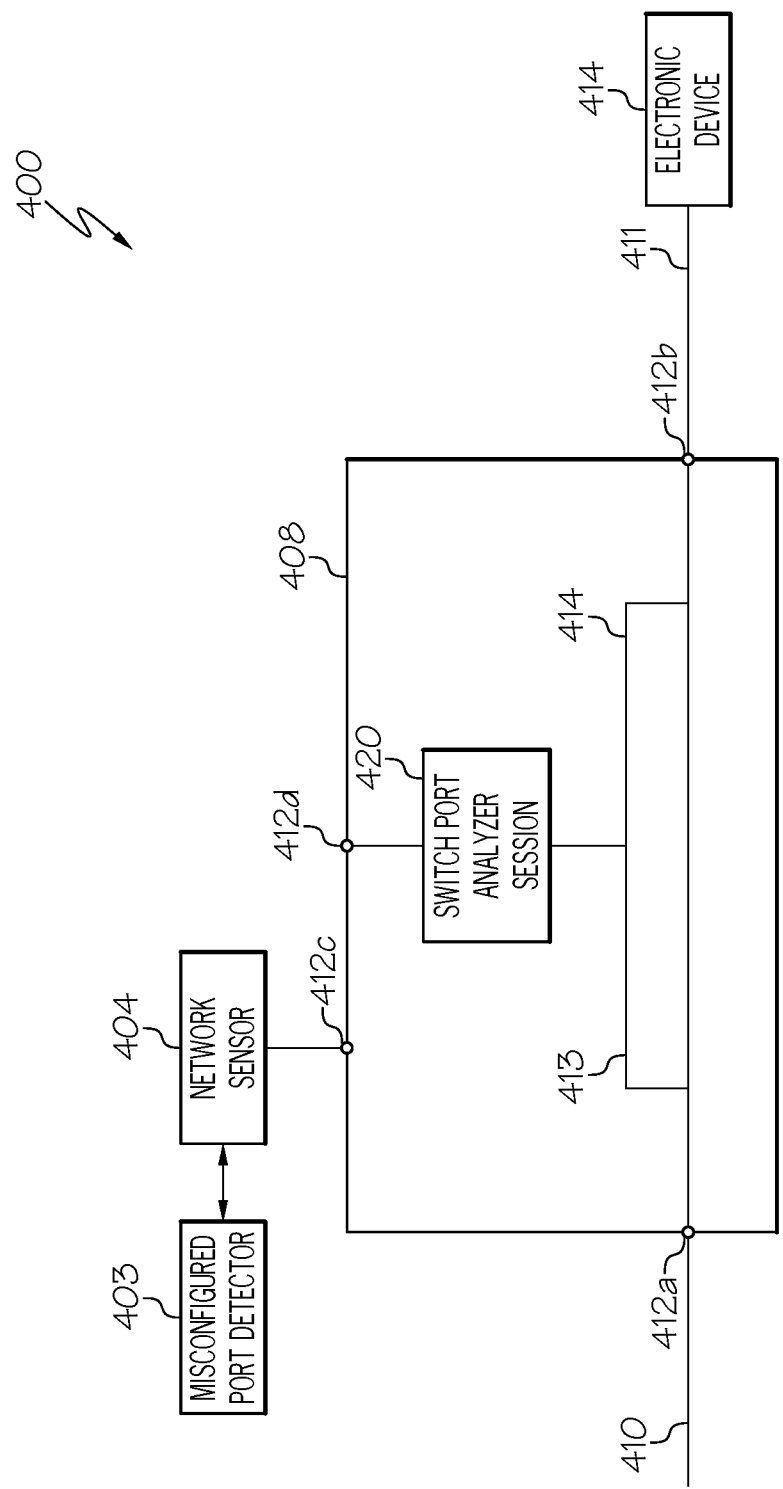
FIG. 4 depicts a switch utilizing a switch port analyzer session to mirror ports according to an example embodiment.

FIG. 4 depicts a switch 408 utilizing a switch port analyzer session 420 to mirror ports 412*a* and/or 412*b* according to an example embodiment. As depicted, the switch 408 includes an ingress port 412*a* receiving an ingress communication channel 410, and an egress port 412*b* connected to an electronic device 414 via an egress communication channel 411. Within the switch 408, a switch port analyzer session 420 creates an ingress mirrored port copy 413 and an egress mirrored port copy 414 for providing to a mirrored analyzer port 412*d*. However, as shown, the network sensor 404 is connected to a different port 412*c* which is not configured for mirroring. The network sensor 404 is connected to the misconfigured port detector 403. In this example, the misconfigured port detector 403 detects that the network sensor 404 is only receiving globally broadcast packets through the port 412*c*, even though the intention is for the network sensor 404 to receive the information being channeled through the ingress mirrored port copy 413 and an egress mirrored port copy 414. Thus, the misconfigured port analyzer 403 monitors and determines that a ratio of unicast packets being received by the network sensor 404 through port 412*c* is much too low and that the port 412*c* is misconfigured. The misconfigured port detector system 403 may be configured to detect this and provide an alert, warning and/or recommendation which is viewable by a network administrator in order to correct the problem.

Figure 5:
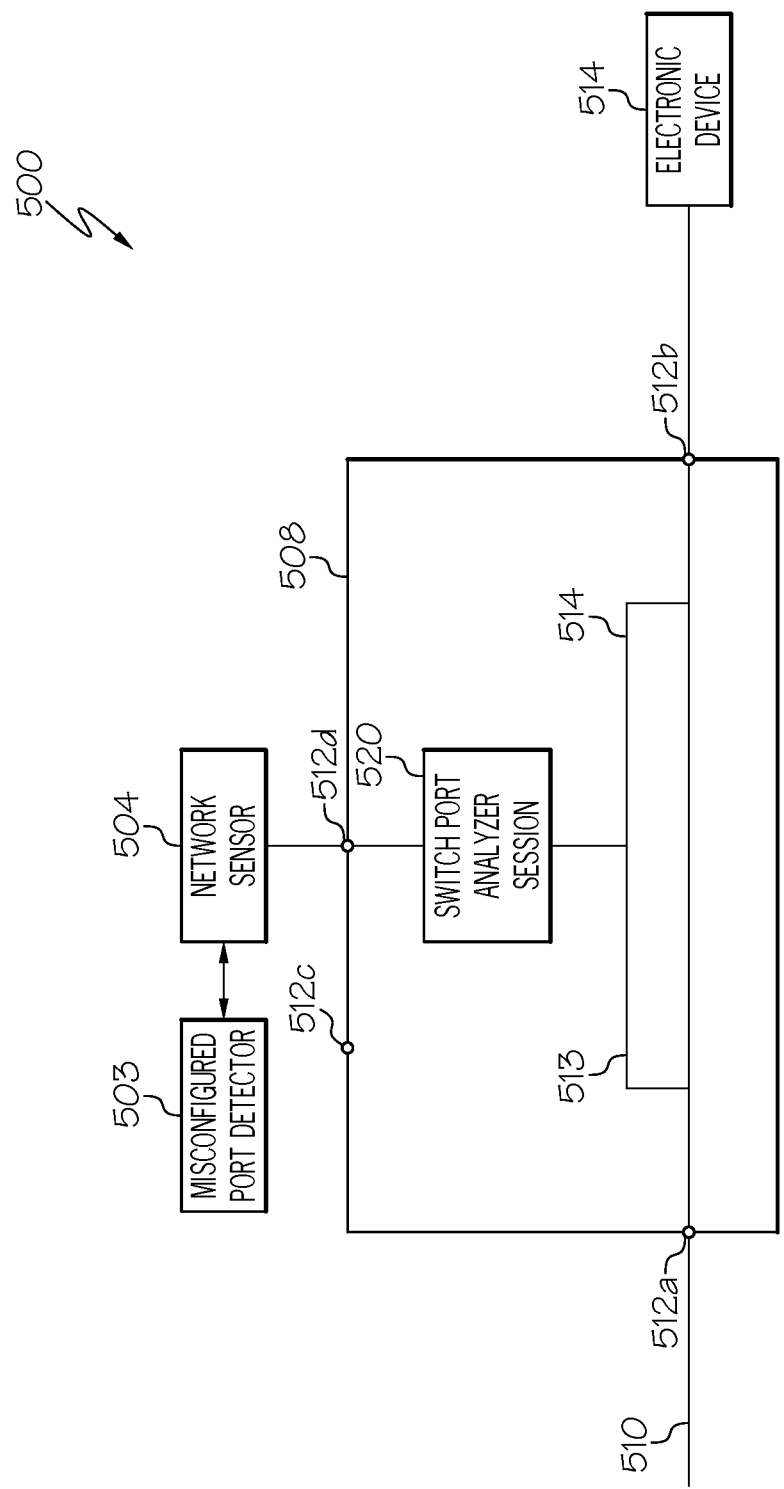
FIG. 5 depicts a switch utilizing a switch port analyzer session to mirror ports according to another example embodiment.

FIG. 5 depicts a switch 508 utilizing a switch port analyzer session 520 to mirror ports 512*a* and/or 512*b* according to an example embodiment. As depicted, the switch 508 includes an ingress port 512*a* receiving an ingress communication channel 510, and an egress port 512*b* connected to an electronic device 514 via an egress communication channel 511. Within the switch 508, a switch port analyzer session 520 creates an ingress mirrored port copy 513 and an egress mirrored port copy 514 for providing to a mirrored analyzer port 512*d*. Unlike the embodiment shown in FIG. 4 above, the network sensor 504 is connected to the proper port 512*d* which is receiving the mirrored packets as intended. Thus, the misconfigured port detector 503 detects that the amount of unicast packets is within the threshold range as expected and no warning is necessary because the ports 512*c*, 512*d* are configured properly.

Figure 6:
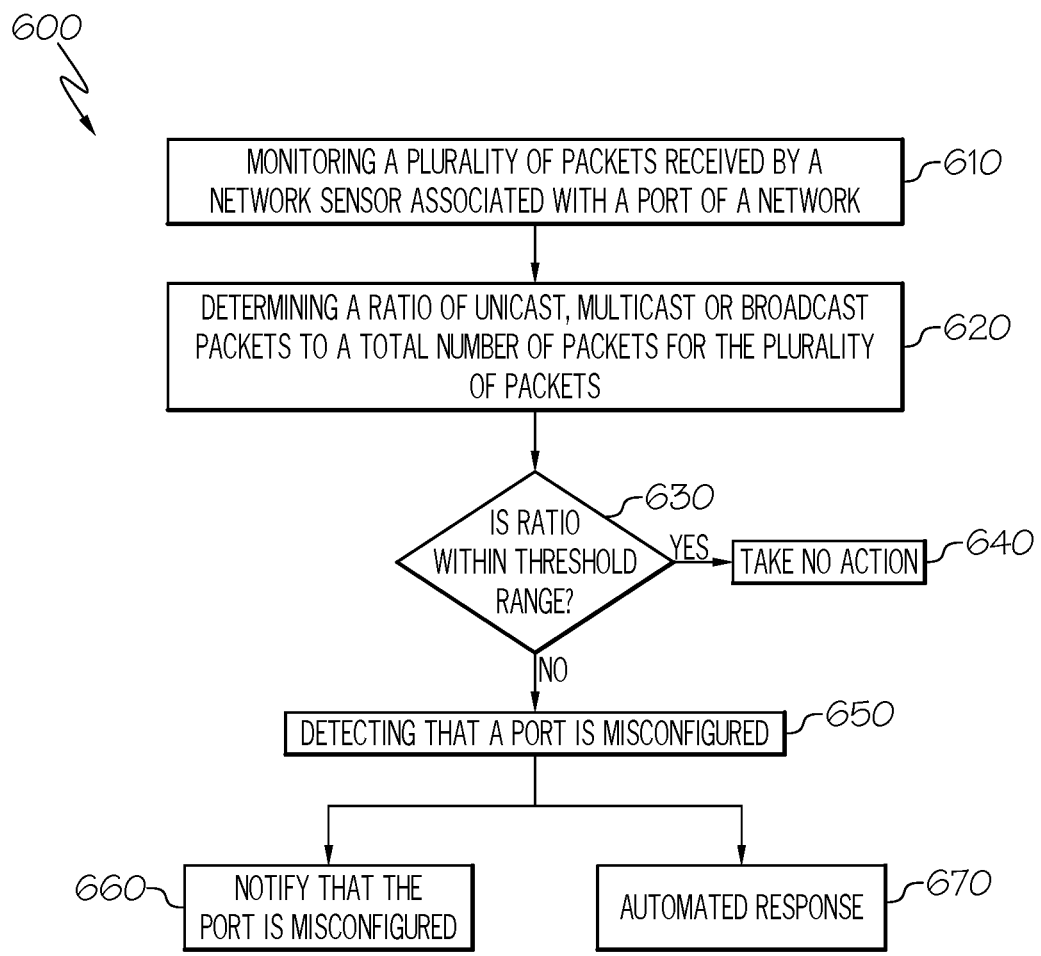
FIG. 6 depicts a method of detecting a misconfigured mirror port according to an example embodiment.

FIG. 6 depicts a method 600 of detecting a misconfigured mirror port according to an example embodiment. The method 600 may be performable one or both of a misconfigured port detector system, such as the misconfigured port detectors 103, 203, 303, 403, 503 described hereinabove, or a threat management system, such as one of the threat management systems 102, 202, 302. The method includes a first step 610 of monitoring a plurality of packets received by a network sensor, such as one of the network sensors 104, 204, 304, 404, 504. The step 610 may include receiving information related to the packets, or receiving the packets for inspection.

The method 600 includes a second step 620 of determining a ratio of unicast, multicast or broadcast packets to a total number of packets for the plurality of packets monitored. The second step 620 may include calculating a percentage of packets, for example, that are unicast packets, or calculating a percentage of packets, for example, that are broadcast packets (or include a special broadcast MAC address).

The method 600 includes a third step 630 of determining whether the percentage or ratio is within a threshold range. For example, in the case of determining the number of unicast packets, a threshold range may be a range below a certain percentage (i.e. if the number of unicast packets is lower than 1% of the total packets). In the case of determining the number of broadcast packets, a threshold range may be a range above a certain percentage (i.e. if the number of broadcast packets is greater than 95% of the total packets). If the ratio is within the threshold range, then no action is taken at a step 640. However, if the ratio is outside the threshold range, then a step 650 includes detecting and/or determining that a port is misconfigured based on the determination that the ratio is outside or beyond the bounds of the threshold range.

Following the step 650, the method 600 includes two possible actions taken. A first option 660 includes automatically notifying a network administrator that the port is misconfigured based on the determination that the ratio is outside or beyond the bounds of a threshold range. The second option 670 may include an automated response, which is described in more detail in FIG. 7.

Figure 7:
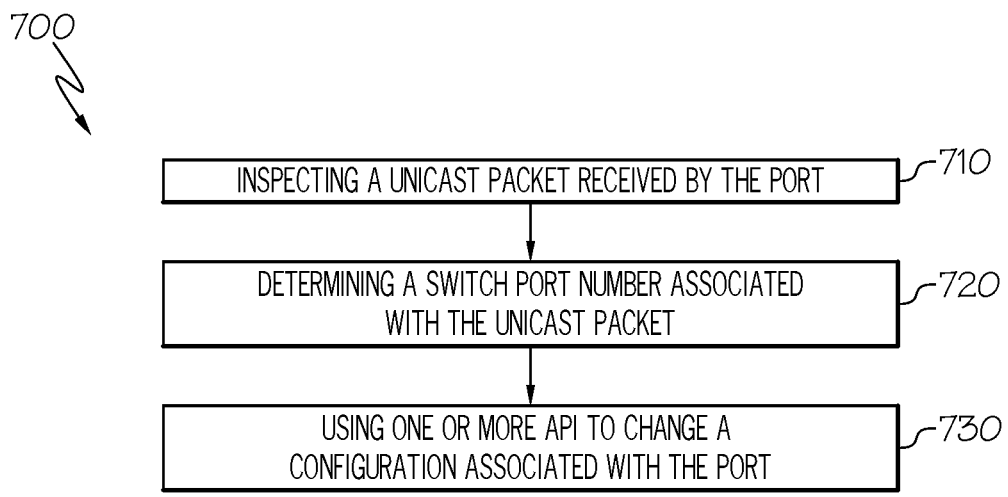
FIG. 7 depicts a method of changing a configuration associated with a port on a network according to an example embodiment.

FIG. 7 depicts a method 700 of changing a configuration associated with a port on a network according to an example embodiment. This method 700 may include exemplary steps of the option 670 described in FIG. 6 for providing an automated response in the event that the method 600 determines or detects that a port is misconfigured. The method 700 includes a first step 710 of inspecting a unicast packet received by a port. The method 700 includes a second step 720 of determining a switch port number associated with the unicast packet. The method 700 includes a third step 730 of using one or more application programming interfaces (APIs) to change a configuration associated with the port of the network.

Figure 8:
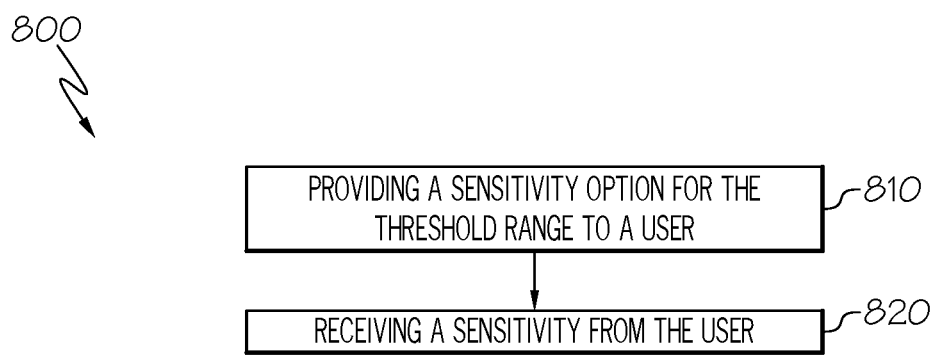
FIG. 8 depicts a method of configuring a sensitivity according to an example embodiment.

FIG. 8 depicts a method 800 of configuring a sensitivity according to an example embodiment. The sensitivity configuration of method 800 may relate to setting a threshold utilized in the step 630 of the method 600. The method 800 includes a first step 810 of providing a selectivity option for a threshold range to a user, such as a network administrator. This step 810 may include providing a software prompt to a user interface or display device being used by the network administrator to configure the misconfigured port detector system. The method 800 may include a second step 820 of receiving a selectivity from the user after the selectivity option is provided. Once received the method 800 may include a third step (not shown) of implementing the sensitivity threshold by the misconfigured port detector system by using this threshold for the determination and/or detection of whether ratios are within a threshold range and thereby making the determination that a port misconfiguration is detected.

The foregoing systems, devices, and methods thereby provide a system and method for determining whether a port of a switch, virtual switch or SDN system, that is connected to a network sensing system, is misconfigured. Embodiments describe receiving, inspecting and/or analyzing packets that are sent to or received by the network sensor to determine whether there are abnormalities in the ratio of the unicast, broadcast and/or multicast types relative to each other and/or relative to the total number of packets received. Systems, devices and/or methods herein may be configured to automatically receive this information and respond with communications which alert a user, provide recommendations for remediation and/or actually take active steps to correct the problem if possible. Enabling the detection of port misconfiguration errors by way of the above-described embodiments provides advantages over the art. For example, embodiments described herein help speed resolution of a misconfiguration so that the network can once again remain protected by the threat management system and/or network sensor. Thus, embodiments described herein reduce the amount of time the network operates without the protection of a network packet examination sensor.

Figure 9:
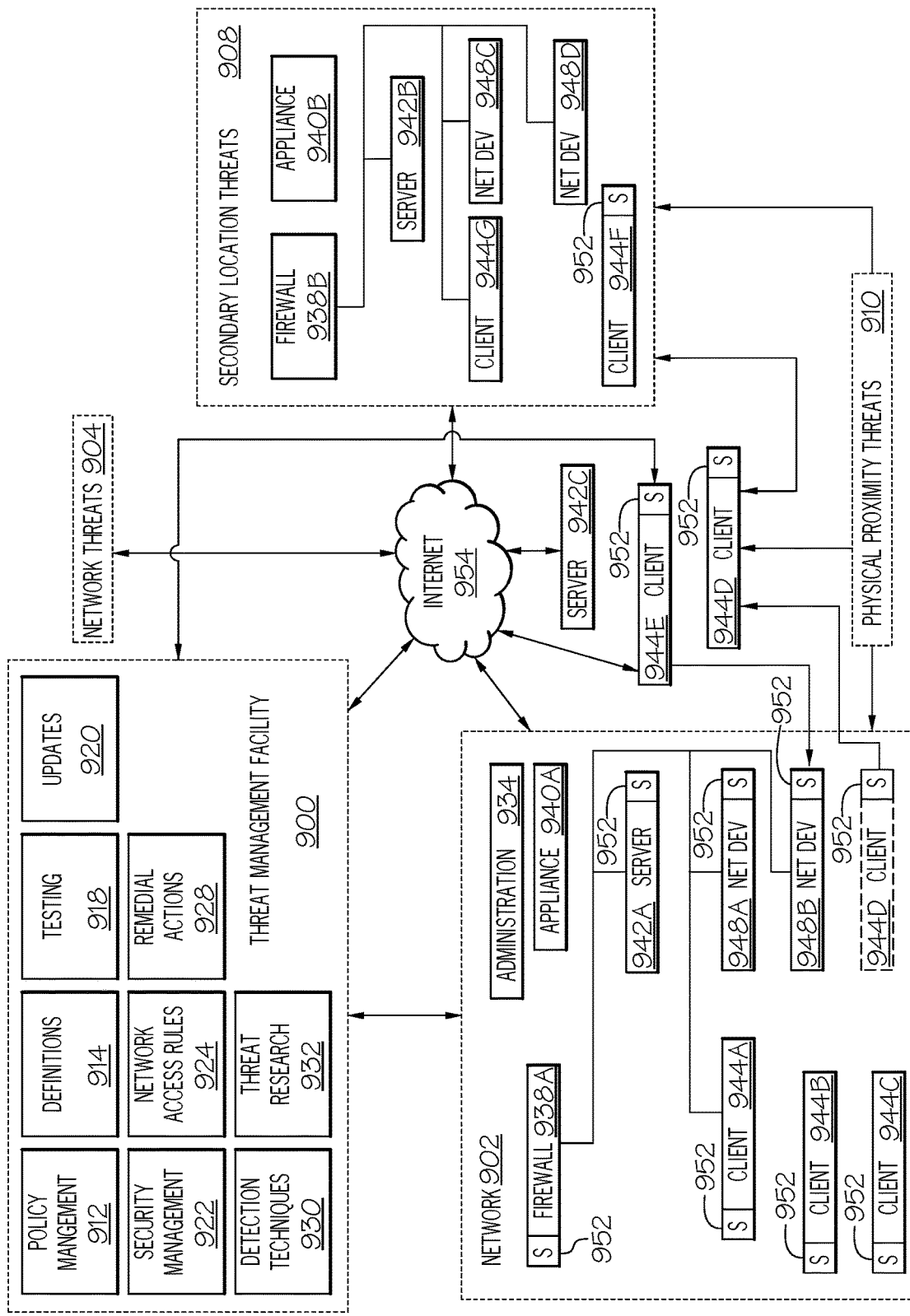
FIG. 9 depicts a diagram of an example environment for threat management according to an example embodiment.

FIG. 9 illustrates an environment for threat management, according to an example embodiment. Specifically, FIG. 9 depicts a block diagram of a threat management facility 900 providing protection to one or more enterprises, networks, locations, users, businesses, etc. against a variety of threats-a context in which the techniques described above may usefully be deployed. The threat management facility 900 may represent any of the threat management systems 102, 202, 302 described herein, and may either include or control the network sensors 104, 204, 304, 404, 504 described herein.

The threat management facility 900 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g. employees, residents, users, guests, etc.) from accessing certain types of applications, devices, resources generally or in a particular manner. Policies may be created, deployed and managed, for example, through the threat management facility 900, which may update and monitor network devices, users, and assets accordingly.

The threat of malware or other compromises may be present at various points within a network 902 such as laptops, desktops, servers, gateways, communication ports, handheld or mobile devices, IoT devices, firewalls. In addition to controlling or stopping malicious code, a threat management facility 900 may provide policy management to control devices, applications, or users that might otherwise undermine productivity and network performance within the network 902.

The threat management facility 900 may provide protection to network 902 from computer-based malware, including viruses, spyware, adware, Trojans, intrusion, spam, policy abuse, advanced persistent threats, uncontrolled access, and the like. In general, the network 902 may be any networked computer-based infrastructure or the like managed by a threat management facility 902, such as an organization, association, institution, or the like, or a cloud-based facility that is available for subscription by individuals. For example, the network 902 may be a corporate, commercial, educational, governmental, or other network 902, and may include multiple networks, computing resources, and other facilities, may be distributed among more than one geographical locations, and may include administration 934, a firewall 938A, an appliance 940A, a server 942A, network devices 948A-B, clients 944A-D, such as IoT devices or other devices. It will be understood that any reference herein to a client or client facilities may include the clients 944A-D shown in FIG. 9 and vice-versa.

The threat management facility 900 may include computers, software, or other computing facilities supporting a plurality of functions, such as security management facility 922, policy management facility 912, update facility 920, a definitions facility 914, network access rules facility 924, remedial action facility 928, detection techniques facility 930, testing facility 918, a threat research facility 932, and the like. In embodiments, the threat protection provided by the threat management facility 900 may extend outside the network boundaries of the network 902 to include clients 944D (or client facilities) that have moved into network connectivity not directly associated with or controlled by the network 902. Threats to client facilities may come from a variety of sources, such as from network threats 904, physical proximity threats 910, secondary location threats 908, and the like. Clients 944A-D may be protected from threats even when the client 944A-D is not directly connected or in association with the network 902, such as when a client 944E-F moves in and out of the network 702, for example when interfacing with an unprotected server 942C through the Internet 954, when a client 944F is moving into a secondary location threat 908 network such as interfacing with components 940B, 942B, 948C, 948D that are not protected, and the like.

The threat management facility 900 may use or may be included in an integrated system approach to provide network 902 protection from a plurality of threats to device resources in a plurality of locations and network configurations. The threat management facility 900 may also or instead be deployed as a stand-alone solution. For example, some or all of the threat management facility 900 components may be integrated into a server or servers at a remote location, for example in a cloud computing facility. For example, some or all of the threat management facility 900 components may be integrated into a firewall, gateway, or access point within or at the border of the network 902. In some embodiments, the threat management facility 900 may be integrated into a product, such as a third-party product, e.g., through an application programming interface, which may be deployed on endpoints, on remote servers, on internal servers or gateways for a network, or some combination of these.

The security management facility 922 may include a plurality of elements that provide protection from malware to network 902 device resources in a variety of ways including endpoint security and control, email security and control, web security and control, reputation-based filtering, control of unauthorized users, control of guest and non-compliant computers, and the like. The security management facility 922 may include a local software application that provides protection to one or more network 902 devices. The security management facility 922 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 922 may provide email security and control. The security management facility 922 may also or instead provide for web security and control, such as by helping to detect or block viruses, spyware, malware, unwanted applications, and the like, or by helping to control web browsing activity originating from client devices. In an embodiment, the security management facility 922 may provide for network access control, which may provide control over network connections. In addition, network access control may control access to virtual private networks (VPN) that provide communications networks tunneled through other networks. The security management facility 922 may provide host intrusion prevention through behavioral based protection, which may guard against known or unknown threats by analyzing behavior before or while code executes. The security management facility 922 may provide reputation filtering, which may target or identify sources of code.

In general, the security management facility 922 may support overall security of the network 902 using the various techniques described above, optionally as supplemented by updates of malicious code information and so forth for distribution across the network 902.

The administration facility 934 may provide control over the security management facility 922 when updates are performed. Information from the security management facility 922 may also be sent from the enterprise back to a third party, a vendor, or the like, which may lead to improved performance of the threat management facility 900.

The threat management facility 900 may include a policy management facility 912 configured to take actions, such as to block applications, users, communications, devices, and so on based on determinations made. The policy management facility 912 may employ a set of rules or policies that determine network 902 access permissions for a client 944. In an embodiment, a policy database may include a block list, a black list, an allowed list, a white list, or the like, or combinations of the foregoing, that may provide a list of resources internal or external to the network 902 that may or may not be accessed by client devices 944. The policy management facility 912 may also or instead include rule-based filtering of access requests or resource requests, or other suitable techniques for controlling access to resources consistent with a corresponding policy.

The policy management facility 912 may also provide configuration policies to be used to compare and control the configuration of applications, operating systems, hardware, devices, network associated with the network 902. An evolving threat environment may dictate timely updates, and thus an update management facility 920 may also be provided by the threat management facility 900. In addition, a policy management facility 912 may require update management (e.g., as provided by the update facility 920 herein described). In embodiments, the update management facility 920 may provide for patch management or other software updating, version control, and so forth.

The security facility 922 and policy management facility 912 may push information to the network 902 and/or a given client 944. The network 902 and/or client 944 may also or instead request information from the security facility 922 and/or policy management facility 912, network server facilities 942, or there may be a combination of pushing and pulling of information. In an embodiment, the policy management facility 912 and the security facility 922 management update modules may work in concert to provide information to the network 902 and/or client 944 facility for control of applications, devices, users, and so on.

Functionality of the network sensors 104, 204, 304, 404, 504 described herein may be incorporated into one or more of the various facilities 912, 914, 918, 920, 922, 924, 928, 930, 932 of the threat management facility 900. Likewise, the network sensors 104, 204, 304, 404, 504 described herein may provide information, data or the like, to the threat management facility 900 and/or the facilities thereof associated with the various devices or servers 952 of the network 902.

As threats are identified and characterized, the threat management facility 900 may create updates that may be used to allow the threat management facility 900 to detect and remediate malicious software, unwanted applications, configuration and policy changes, and the like. The threat definition facility 914 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 922 when scanning files or applications within the client facility for the determination of malicious code that may be within the file or application. A definition management facility may include a definition for a neural network or other recognition engine. A definition management facility 914 may provide timely updates of definition files information to the network, client facilities, and the like.

The security management facility 922 may be used to scan an outgoing file and verify that the outgoing file is permitted to be transmitted per the enterprise facility 902 rules and policies. By checking outgoing files, the security management facility 922 may be able to discover malicious code infected files that were not detected as incoming files.

The threat management facility 900 may provide controlled access to the network 902. A network access rules facility 924 may be responsible for determining if a client facility 744 application should be granted access to a requested network resource. In an embodiment, the network access rules facility 924 may verify access rights for client facilities 944 to or from the network 902 or may verify access rights of computer facilities to or from external networks. When network access for a client facility is denied, the network access rules facility 924 may send an information file to the client facility, e.g., a command or command file that the remedial action facility 928 may access and take action upon. The network access rules facility 924 may include one or more databases that may include a block list, a black list, an allowed list, a white list, a reputation list, an unacceptable network resource database, an acceptable network resource database, a network resource reputation database, or the like. The network access rules facility 924 may incorporate rule evaluation. Rule evaluation may, for example, parse network access requests and apply the parsed information to network access rules. The network access rule facility 924 may also or instead provide updated rules and policies to the enterprise facility 902.

When a threat or policy violation is detected by the threat management facility 900, the threat management facility 900 may perform or initiate remedial action through a remedial action facility 928. Remedial action may take a variety of forms, such as terminating or modifying an ongoing process or interaction, issuing an alert, sending a warning to a client or administration facility 934 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on the client facility 944, quarantining a related application (or files, processes or the like), terminating the application or device, isolating the application or device, moving a process or application code to a sandbox for evaluation, isolating the client facility 944 to a location or status within the network that restricts network access, blocking a network access port from a client facility 944, reporting the application to an administration facility 934, or the like, as well as any combination of the foregoing.

Remedial action may be provided as a result of a detection of a threat or violation. The detection techniques facility 930 may include tools for monitoring the network or managed devices within the network 902. The detection techniques facility 930 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 900 detects threats and violations to established policy, may require the ability to test the system, either at the system level or for a particular computing component. The testing facility 918 may allow the administration facility 934 to coordinate the testing of the security configurations of client facility computing facilities on a network. For example, the administration facility 934 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 934. The administration facility 934 may be able to determine the level of preparedness of the client facility 944 based on the reported information. Remedial action may be taken for any of the client facilities 944 as determined by the administration facility 934.

The threat management facility 900 may provide threat protection across the network 902 to devices such as clients 944, a server facility 942, an administration facility 934, a firewall 938, a gateway, one or more network devices (e.g., hubs and routers 948, a threat management or other appliance 940, any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 902, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 902. The endpoint computer security facility 952 may be an application locally loaded onto any corresponding computer platform or computer support component, either for local security functions or for management by the threat management facility 900 or other remote resource, or any combination of these.

The network 902 may include a plurality of client facility computing platforms on which the endpoint computer security facility 952 is installed. A client facility computing platform may be a computer system that is able to access a service on another computer, such as a server facility 942, via a network. The endpoint computer security facility 952 may, in corresponding fashion, provide security in any suitable context such as among a plurality of networked applications, for a client facility connecting to an application server facility 942, for a web browser client facility connecting to a web server facility 942, for an e-mail client facility retrieving e-mail from an Internet 954 service provider's mail storage servers 942 or web site, and the like, as well as any variations or combinations of the foregoing.

The network 902 may include one or more of a variety of server facilities 942, such as application servers, communications servers, file servers, database servers, proxy servers, mail servers, fax servers, game servers, web servers, and the like. A server facility 942, which may also be referred to as a server facility 942 application, server facility 942 operating system, server facility 942 computer, or the like, may be any device(s), application program(s), operating system(s), or combination of the foregoing that accepts client facility connections in order to service requests from clients 944. In embodiments, the threat management facility 900 may provide threat protection to server facilities 942 within the network 902 as load conditions and application changes are made.

A server facility 942 may include an appliance facility 940, where the appliance facility 940 provides specific services to other devices on the network. Simple server facility 942 appliances may also be utilized across the network 902 infrastructure, such as switches, routers, hubs, gateways, print servers, modems, and the like. These appliances may provide interconnection services within the network 902, and therefore may advance the spread of a threat if not properly protected.

A client facility 944 may be protected from threats from within the network 902 using a local or personal firewall, which may be a hardware firewall, software firewall, or combination, that controls network traffic to and from a client. The local firewall may permit or deny communications based on a security policy. Another component that may be protected by an endpoint computer security facility 952 is a network firewall facility 938, which may include hardware or software, in a standalone device or integrated with another network component, that may be configured to permit, deny, or proxy data through a network 902.

The interface between the threat management facility 900 and the network 902, and through the appliance facility 940 to embedded endpoint computer security facilities, may include a set of tools that may be the same or different for various implementations, and may allow each network administrator to implement custom controls. In embodiments, these controls may include both automatic actions and managed actions. The administration facility 934 may configure policy rules that determine interactions. The administration facility 934 may also establish license management, which in turn may further determine interactions associated with licensed applications. In embodiments, interactions between the threat management facility 900 and the network 902 may provide threat protection to the network 902 by managing the flow of network data into and out of the network 902 through automatic actions that may be configured by the threat management facility 900 for example by action or configuration of the administration facility 934.

Client facilities 944 within the network 902 may be connected to the network 902 by way of wired network facilities 948A or wireless network facilities 948B. Mobile wireless facility clients 944, because of their ability to connect to a wireless network access point, may connect to the Internet 954 outside the physical boundary of the network 902, and therefore outside the threat-protected environment of the network 902. Such a client 944, if not for the presence of a locally-installed endpoint computer security facility 952, may be exposed to a malware attack or perform actions counter to network 902 policies. Thus, the endpoint computer security facility 952 may provide local protection against various threats and policy violations. The threat management facility 900 may also or instead be configured to protect the out-of-enterprise facility 902 mobile client facility (e.g., the clients 944) through interactions over the Internet 954 (or other network) with the locally-installed endpoint computer security facility 952. Thus mobile client facilities that are components of the network 902 but temporarily outside connectivity with the network 902 may be provided with the threat protection and policy control the same as or similar to client facilities 944 inside the network 902. In addition, mobile client facilities 944 may receive the same interactions to and from the threat management facility 900 as client facilities 944 inside the enterprise facility 902, such as by receiving the same or equivalent services via an embedded endpoint computer security facility 952.

Interactions between the threat management facility 900 and the components of the network 902, including mobile client facility extensions of the network 902, may ultimately be connected through the Internet 954 or any other network or combination of networks. Security-related or policy-related downloads and upgrades to the network 902 may be passed from the threat management facility 900 through to components of the network 902 equipped with the endpoint computer security facility 952. In turn, the endpoint computer security facility 952 components of the enterprise facility or network 902 may upload policy and access requests back across the Internet 954 and through to the threat management facility 900. The Internet 954 however, is also the path through which threats may be transmitted from their source, and an endpoint computer security facility 952 may be configured to protect a device outside the network 902 through locally-deployed protective measures and through suitable interactions with the threat management facility 900.

Thus, if the mobile client facility were to attempt to connect into an unprotected connection point, such as at a secondary location 908 hat is not a part of the network 902, the mobile client facility 944 may be required to request network interactions through the threat management facility 900, where contacting the threat management facility 900 may be performed prior to any other network action. In embodiments, the client facility's 944 endpoint computer security facility 952 may manage actions in unprotected network environments such as when the client facility (e.g., client 944F) is in a secondary location 908, where the endpoint computer security facility 952 may dictate what applications, actions, resources, users, etc. are allowed, blocked, modified, or the like.

The secondary location 908 may have no endpoint computer security facilities 952 as a part of its components, such as its firewalls 938B, servers 942B, clients 944G, hubs and routers 948C-D, and the like. As a result, the components of the secondary location 908 may be open to threat attacks, and become potential sources of threats, as well as any mobile enterprise facility clients 944B-F that may be connected to the secondary location's 908 network. In this instance, these components may now unknowingly spread a threat to other connected to the network 902.

Some threats do not come directly from the Internet 954. For example, a physical proximity threat 910 may be deployed on a client device while that device is connected to an unprotected network connection outside the enterprise facility 902, and when the device is subsequently connected to a client 944 on the network 902, the device can deploy the malware or otherwise pose a threat. In embodiments, the endpoint computer security facility 952 may protect the network 902 against these types of physical proximity threats 910, for instance, through scanning any device prior to allowing data transfers, through security validation certificates, through establishing a safe zone within the network 902 to receive data for evaluation, and the like.

Figure 10:
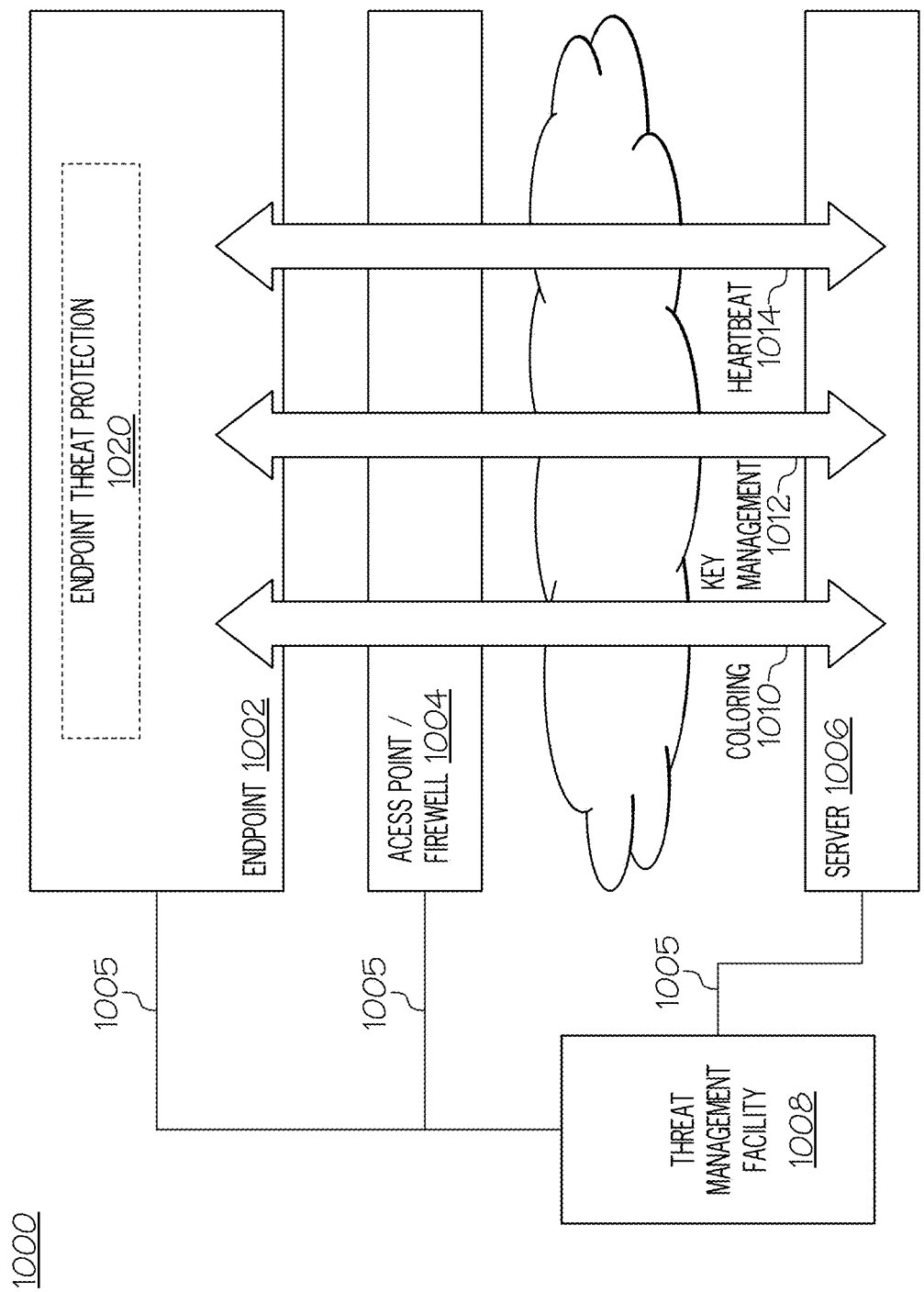
FIG. 10 depicts a diagram of an exemplary threat management system according to an example embodiment.

FIG. 10 illustrates one example of a threat management system 1000 as contemplated herein, according to an example embodiment. In general, the threat management system 1000 may include an endpoint 1002 for example, a laptop, or a device such as an IoT device, an access point 1004, a server 1006 and a threat management facility 1008 in communication with one another directly or indirectly through a data network 1005, for example, as generally described above. The threat management facility 1008 may include one or more network sensors, such as the network sensors 104, 204, 304, 404, 504 described hereinabove, which may be an integral component thereof for receiving information from the various endpoints 1002, servers 1006 or the like for processing and managing threats.

A number of systems may be distributed across these various components to support threat management, for example, including a coloring system 1010, a key management system 1012 and a heartbeat system 1014, each of which may include software components executing on any of the foregoing system components, and each of which may communicate with the threat management facility 1008 or an endpoint threat protection agent 1020 executing on an endpoint 1002, on an access point or firewall 1004, or on a server 1006 to support improved threat detection and remediation.

The coloring system 1010 may be used to label or 'color' software objects for improved tracking and detection of potentially harmful activity. The coloring system 1010 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 510 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy.

The key management system 1012 may support management of keys for the endpoint 1002 in order to selectively permit or prevent access to content on the endpoint 1002 on a file-specific basis, a process-specific basis, an application-specific basis, a user-specific basis, or any other suitable basis in order to prevent data leakage, and in order to support more fine-grained and immediate control over access to content on the endpoint 1002 when a security compromise is detected. Thus for example, if a particular process executing on the endpoint is compromised, or potentially compromised or otherwise under suspicion, keys to that process may be revoked in order to prevent, e.g., data leakage or other malicious activity. In embodiments, keys on device may be revoked based on one or more reliability index values, the meeting of one or more reliability index thresholds, the rate of change of one or more reliability index values, etc.

The heartbeat system 1014 may be used to provide periodic or aperiodic information from an endpoint about system health, security, status, etc. A heartbeat may be encrypted or plaintext, or some combination of these, and may be communicated unidirectionally (e.g., from the endpoint 1002 to the threat management facility 1008) or bidirectionally (e.g., between the endpoint 1002 and the server 1006, or any other pair of system components) on a useful schedule.

In implementations, the access point or firewall 1004 may use the heartbeat 1014 to report a potential or actual compromise of a device based, for example, on a color of the device, or based on one or more reliability index values, the meeting of one or more reliability index thresholds, the rate of change of one or more reliability index values, etc. The heartbeat 1014 from the access point 1004 may be communicated to a server 1006, for example, and administrative server or directly or indirectly to a threat management facility 1008. If the endpoint device 1002 has an endpoint threat protection facility 1020, the facility 1020 may be used to further investigate the status, or to take remedial measures, again by communication using the secure heartbeat 1014.

In general, these various monitoring and management systems may cooperate to provide improved threat detection and response. For example, the coloring system 1010 may be used to evaluate when a particular device is potentially compromised, and a potential threat may be confirmed based on an interrupted heartbeat from the heartbeat system 1014. The key management system 1012 may then be used to revoke keys to a process so that no further files can be opened, deleted or otherwise modified. More generally, the cooperation of these systems enables a wide variety of reactive measures that can improve detection and remediation of potential threats to an endpoint.

Figure 11:
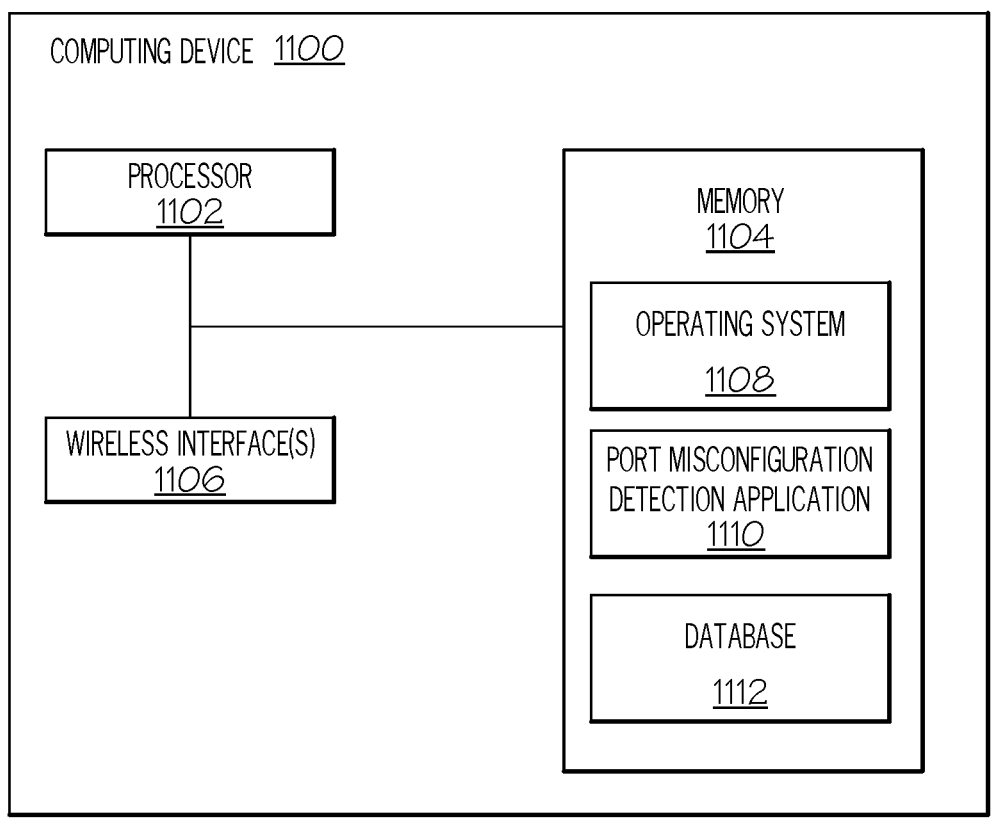
FIG. 11 depicts a diagram of an example computing device according to an example embodiment.

FIG. 11 is a diagram of an example computing device 1100, according to an example embodiment. As shown, the computing device 1100 includes one or more processors 1102, non-transitory computer readable medium or memory 1104, I/O interface devices 1106 (e.g., wireless communications, etc.) and a network interface 1108. The computer readable medium 1104 may include an operating system 1108, a port misconfiguration detection application 1110 for detecting misconfigured ports in accordance with the systems and methods described herein.

In operation, the processor 1102 may execute the application 1110 stored in the computer readable medium 1104. The application 1110 may include software instructions that, when executed by the processor, cause the processor to perform operations for detecting a misconfigured mirrored port, as described and shown in FIGS. 1-8, with particular reference to the steps of the methodology shown in FIGS. 6-8.

The application program 1110 may operate in conjunction with the data section 1112 and the operating system 1108. The device 1100 may communicate with other devices (e.g., a wireless access point) via the I/O interfaces 1106.

Although the foregoing Figures illustrate various embodiments of the disclosed systems and methods, additional and/or alternative embodiments are contemplated as falling within the scope of this disclosure. For example, in one embodiment, this disclosure provides for a method that includes monitoring, by one or more processors of a computer system, a plurality of packets received by a network sensor associated with a port of a network. The method then includes determining, by the one or more processors of the computer system, a ratio of unicast, multicast or broadcast packets to a total number of packets for the plurality of packets, determining, by the one or more processors of the computer system, that the ratio is outside the bounds of a threshold range, and detecting, by the one or more processors of the computer system, that a port is misconfigured based on the determination that the ratio is outside the bounds of a threshold range. The method then includes automatically notifying, by the one or more processors of the computer system, a network administrator that the port is misconfigured based on the determination that the ratio is outside the bounds of a threshold range.

In another embodiment of the method, the determining the ratio of unicast, multicast or broadcast packets to a total number of packets for the plurality of packets comprises determining the ratio of unicast packets to a total number of packets, and the determining that the ratio is outside the bounds of the threshold range includes determining that the ratio is less than a threshold.

In a further embodiment of the method, the threshold is less than one percent.

In yet another embodiment, the method further includes triggering, by the one or more processors of the computer system, an automated response after the detection that the port is misconfigured.

In yet a further embodiment, the automated response includes: inspecting, by the one or more processors of the computer system, a unicast packet received by the port, determining, by the one or more processors of the computer system, a switch port number associated with the unicast packet, and using, by the one or more processors of the computer system, one or more application programming interfaces to change a configuration associated with the port of the network.

In another embodiment, the method further includes providing, by the one or more processors of the computer system, a sensitivity option for the threshold range to a user; and receiving, by the one or more processors of the computer system, a sensitivity from the user after the sensitivity option is provided.

In a further embodiment of the method, the automatically notifying includes providing a warning to a user interface of an application associated with the network sensor.

In yet another embodiment of the method, the port of the network is a virtual port on a virtual switch.

In yet a further embodiment of the method, the port of the network is a virtual port on a physical switch.

In another embodiment, the disclosure provides for a computer system, that includes one or more computer processors, one or more computer readable storage media, and computer readable code stored collectively in the one or more computer readable storage media, with the computer readable code including data and instructions to cause the one or more computer processors to perform a method that includes: monitoring, by the one or more processors of the computer system, a plurality of packets received by a network sensor associated with a port of a network, determining, by the one or more processors of the computer system, a ratio of unicast, multicast or broadcast packets to a total number of packets for the plurality of packets, determining, by the one or more processors of the computer system, that the ratio is outside the bounds of a threshold range, detecting, by the one or more processors of the computer system, that a port is misconfigured based on the determination that the ratio is outside the bounds of a threshold range, and automatically notifying, by the one or more processors of the computer system, a network administrator that the port is misconfigured based on the determination that the ratio is outside the bounds of a threshold range.

In another embodiment of the computer system, the determining the ratio of unicast, multicast or broadcast packets to a total number of packets for the plurality of packets comprises determining the ratio of unicast packets to a total number of packets, and the determining that the ratio is outside the bounds of the threshold range includes determining that the ratio is less than a threshold.

In a further embodiment of the computer system, the threshold is less than one percent.

In yet another embodiment of the computer system, the method further includes triggering, by the one or more processors of the computer system, an automated response after the detection that the port is misconfigured.

In yet a further embodiment of the computer system, the automated response of the method further includes: inspecting, by the one or more processors of the computer system, a unicast packet received by the port; determining, by the one or more processors of the computer system, a switch port number associated with the unicast packet; and using, by the one or more processors of the computer system, one or more application programming interfaces to change a configuration associated with the port of the network.

In another embodiment of the computer system, the method further includes providing, by the one or more processors of the computer system, a sensitivity option for the threshold range to a user; and receiving, by the one or more processors of the computer system, a sensitivity from the user after the sensitivity option is provided.

In a further embodiment of the computer system, the automatically notifying includes providing a warning to a user interface of an application associated with the network sensor.

In yet another embodiment of the computer system, the port of the network is a virtual port on a virtual switch.

In yet a further embodiment of the computer system, the port of the network is a physical port on a physical switch.

In another embodiment, the disclosure provides for a computer program product that includes one or more computer readable storage media having computer readable program code collectively stored on the one or more computer readable storage media, the computer readable program code being executed by one or more processors of a computer system to cause the computer system to perform a method. The method includes monitoring, by the one or more processors of the computer system, a plurality of packets received by a network sensor associated with a port of a network, determining, by the one or more processors of the computer system, a ratio of unicast, multicast or broadcast packets to a total number of packets for the plurality of packets, determining, by the one or more processors of the computer system, that the ratio is outside the bounds of a threshold range, detecting, by the one or more processors of the computer system, that a port is misconfigured based on the determination that the ratio is outside the bounds of a threshold range, and automatically notifying, by the one or more processors of the computer system, a network administrator that the port is misconfigured based on the determination that the ratio is outside the bounds of a threshold range.

In another embodiment of the computer program product, the determining the ratio of unicast, multicast or broadcast packets to a total number of packets for the plurality of packets comprises determining the ratio of unicast packets to a total number of packets, and the determining that the ratio is outside the bounds of the threshold range includes determining that the ratio is less than a threshold.

In a further embodiment of the computer program product, the threshold is less than one percent.

In yet another embodiment of the computer program product, the method further includes triggering, by the one or more processors of the computer system, an automated response after the detection that the port is misconfigured.

In yet a further embodiment of the computer program product, the automated response of the method further includes: inspecting, by the one or more processors of the computer system, a unicast packet received by the port; determining, by the one or more processors of the computer system, a switch port number associated with the unicast packet; and using, by the one or more processors of the computer system, one or more application programming interfaces to change a configuration associated with the port of the network.

In another embodiment of the computer program product, the method further includes providing, by the one or more processors of the computer system, a sensitivity option for the threshold range to a user; and receiving, by the one or more processors of the computer system, a sensitivity from the user after the sensitivity option is provided.

In a further embodiment of the computer program product, the automatically notifying includes providing a warning to a user interface of an application associated with the network sensor.

In yet another embodiment of the computer program product, the port of the network is a virtual port on a virtual switch.

In yet a further embodiment of the computer program product, the port of the network is a physical port on a physical switch.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for secure VLAN in wireless networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for detecting a misconfigured port in a packet forwarding configuration comprising:

monitoring, by one or more processors of a computer system, a plurality of packets received by a network sensor associated with a port of a network;

determining, by the one or more processors of the computer system, a ratio of unicast, multicast or broadcast packets from the plurality of packets received to the total number of all of the plurality of packets received;

providing, by the one or more processors of the computer system, a user with a sensitivity option to configure a sensitivity of a threshold range associated with the ratio;

determining, by the one or more processors of the computer system, that the ratio is outside the bounds of the threshold range;

detecting, by the one or more processors of the computer system, that a port is misconfigured for port mirroring based on the determination that the ratio is outside the bounds of the threshold range; and automatically notifying, by the one or more processors of the computer system, a network administrator that the port is misconfigured based on the determination that the ratio is outside the bounds of the threshold range.

2. The method of claim 1, wherein the determining the ratio of unicast, multicast or broadcast packets to a total number of packets for the plurality of packets comprises determining the ratio of unicast packets to a total number of packets, and wherein the determining that the ratio is outside the bounds of the threshold range includes determining that the ratio is less than a threshold.

3. The method of claim 2, wherein the threshold is less than one percent.

4. The method of claim 1, further comprising:
triggering, by the one or more processors of the computer system, an automated response after the detection that the port is misconfigured.

5. The method of claim 4, wherein the automated response includes:
inspecting, by the one or more processors of the computer system, a unicast packet received by the port;
determining, by the one or more processors of the computer system, a switch port number associated with the unicast packet; and
using, by the one or more processors of the computer system, one or more application programming interfaces to change a configuration associated with the port of the network.

6. The method of claim 1, further comprising:
providing, by the one or more processors of the computer system, a sensitivity option for the threshold range to a user; and
receiving, by the one or more processors of the computer system, a sensitivity from the user after the sensitivity option is provided.

7. The method of claim 1, wherein the automatically notifying includes providing a warning to a user interface of an application associated with the network sensor.

8. The method of claim 1, wherein the port of the network is a virtual port on a virtual switch.

9. The method of claim 1, wherein the port of the network is a physical port on a physical switch.

10. A computer system, comprising:
one or more processors;
one or more computer readable storage media; and
computer readable code stored collectively in the one or more computer readable storage media, with the computer readable code including data and instructions to cause the one or more computer processors to perform a method for detecting a misconfigured port in a packet forwarding configuration comprising:
monitoring, by the one or more processors of the computer system, a plurality of packets received by a network sensor associated with a port of a network;
determining, by the one or more processors of the computer system, a ratio of unicast, multicast or broadcast packets from the plurality of packets received to the total number of all of the plurality of packets received;
providing, by the one or more processors of the computer system, a user with a sensitivity option to configure a sensitivity of a threshold range associated with the ratio;

determining, by the one or more processors of the computer system, that the ratio is outside the bounds of the threshold range;
detecting, by the one or more processors of the computer system, that a port is misconfigured for port mirroring based on the determination that the ratio is outside the bounds of the threshold range; and
automatically notifying, by the one or more processors of the computer system, a network administrator that the port is misconfigured based on the determination that the ratio is outside the bounds of the threshold range.

11. The computer system of claim 10, wherein the determining the ratio of unicast, multicast or broadcast packets to a total number of packets for the plurality of packets comprises determining the ratio of unicast packets to a total number of packets, and wherein the determining that the ratio is outside the bounds of the threshold range includes determining that the ratio is less than a threshold.

12. The computer system of claim 11, wherein the threshold is less than one percent.

13. The computer system of claim 10, the method further comprising:
triggering, by the one or more processors of the computer system, an automated response after the detection that the port is misconfigured.

14. The computer system of claim 13, wherein the automated response of the method further includes:
inspecting, by the one or more processors of the computer system, a unicast packet received by the port;
determining, by the one or more processors of the computer system, a switch port number associated with the unicast packet; and
using, by the one or more processors of the computer system, one or more application programming interfaces to change a configuration associated with the port of the network.

15. The computer system of claim 10, wherein the method further comprises:
providing, by the one or more processors of the computer system, a sensitivity option for the threshold range to a user; and
receiving, by the one or more processors of the computer system, a sensitivity from the user after the sensitivity option is provided.

16. The computer system of claim 10, wherein the automatically notifying includes providing a warning to a user interface of an application associated with the network sensor.

17. The computer system of claim 10, wherein the port of the network is a virtual port on a virtual switch.

18. The computer system of claim 10, wherein the port of the network is a physical port on a physical switch.

19. A computer program product comprising:
one or more non-transitory computer readable storage media having computer readable program instructions collectively stored on the one or more computer readable storage media, the computer readable program instructions being executed by one or more processors of a computer system to cause the computer system to perform a method for detecting a misconfigured port in a packet forwarding configuration comprising:
monitoring, by the one or more processors of the computer system, a plurality of packets received by a network sensor associated with a port of a network;
determining, by the one or more processors of the computer system, a ratio of unicast, multicast or broadcast packets from the plurality of packets received to the total number of all of the plurality of packets received;

providing, by the one or more processors of the computer system, a user with a sensitivity option to configure a sensitivity of a threshold range associated with the ratio;

determining, by the one or more processors of the computer system, that the ratio is outside the bounds of the threshold range;

detecting, by the one or more processors of the computer system, that a port is misconfigured for port mirroring based on the determination that the ratio is outside the bounds of the threshold range; and automatically notifying, by the one or more processors of the computer system, a network administrator that the port is misconfigured based on the determination that the ratio is outside the bounds of the threshold range.

20. The computer program product of claim 19, wherein the determining the ratio of unicast, multicast or broadcast packets to a total number of packets for the plurality of packets comprises determining the ratio of unicast packets to a total number of packets, and wherein the determining that the ratio is outside the bounds of the threshold range includes determining that the ratio is less than a threshold.

* * * * *